(12) United States Patent
Gaikwad

(10) Patent No.: US 10,452,266 B2
(45) Date of Patent: Oct. 22, 2019

(54) DIRECTORY STORAGE CONTROL FOR COMMONLY USED PATTERNS

(71) Applicant: Arteris, Inc., Campbell, CA (US)

(72) Inventor: Parimal Gaikwad, San Jose, CA (US)

(73) Assignee: ARTERIS, INC., Campbell, CA (US)

( * ) Notice: Subject to any disclaimer, the term of this patent is extended or adjusted under 35 U.S.C. 154(b) by 158 days.

(21) Appl. No.: 15/390,749

(22) Filed: Dec. 27, 2016

(65) Prior Publication Data

US 2017/0192680 A1  Jul. 6, 2017

Related U.S. Application Data

(63) Continuation-in-part of application No. 14/985,354, filed on Dec. 30, 2015, now Pat. No. 9,652,391.

(51) Int. Cl.
| | |
|---|---|
| *G06F 3/06* | (2006.01) |
| *G06F 12/0815* | (2016.01) |
| *G06F 12/0893* | (2016.01) |
| *G06F 12/0817* | (2016.01) |

(52) U.S. Cl.
CPC .......... *G06F 3/0604* (2013.01); *G06F 3/0608* (2013.01); *G06F 3/0629* (2013.01); *G06F 3/0653* (2013.01); *G06F 3/0673* (2013.01); *G06F 12/0815* (2013.01); *G06F 12/0817* (2013.01); *G06F 12/0893* (2013.01); *G06F 2212/1044* (2013.01); *G06F 2212/621* (2013.01)

(58) Field of Classification Search
CPC ............. G06F 12/0815; G06F 12/0893; G06F 12/0817–12/0828; G06F 3/0604; G06F 3/0608; G06F 3/0629; G06F 3/0653; G06F 3/0673
See application file for complete search history.

(56) References Cited

PUBLICATIONS

Zhao, Hongzhou, Arrvindh Shriraman, and Sandhya Dwarkadas. "SPACE: Sharing pattern-based directory coherence for multicore scalability." Proceedings of the 19th international conference on Parallel architectures and compilation techniques. ACM, 2010. Year: 2010).*

Tanenbaum, Andrew S. Structured computer organization. Upper Saddle River, N.J: Pearson Prentice Hall, 2006. (Year: 2006).*

\* cited by examiner

*Primary Examiner* — Charles Rones
*Assistant Examiner* — Hewy H Li
(74) *Attorney, Agent, or Firm* — Dana Legal Services; Jubin Dana

(57) ABSTRACT

A system and method are disclosed with the ability to track usage of information and determine commonly used patterns to be stored and updated in a directory. The information includes counter values that represent the frequency of occurrence of a pattern that is committed to the directory. Thus, allows the system to control and reduce the size allocated to storing information in the directory because the size is reduced by limiting address bits. This, in turn, creates additional benefits in speed and power because it allows subsystems to avoid transmitting, storing, and operating upon excessive address information.

5 Claims, 7 Drawing Sheets

400

| Pattern 1 | Counter 1 |
| Pattern 2 | Counter 2 |
| ... | ... |
| Pattern M | Counter M |

DIRECTORY STORAGE CONTROL FOR COMMONLY USED PATTERNS

CROSS-REFERENCE TO RELATED APPLICATIONS

This application is a continuation-in-part of U.S. application Ser. No. 14/985,354 field on Dec. 30, 2015 entitled COMPRESSION OF HARDWARE CACHE COHERENT ADDRESSES by David A. KRUCKEMYER et al., the entire disclosure of which is incorporated in its entirety by reference.

FIELD OF THE INVENTION

The present invention is in the field of computer systems and, more specifically, to systems-on-chip comprising components that transmit, store, and operate on memory addresses.

BACKGROUND

Modern computer systems are designed with heterogeneous processing units that perform data processing operations on data values stored in memory. One example of such a system comprises a processing unit with a 40 bit address bus that can address $2^{40}$ bytes; a $2^{32}$-byte (4 GB) addressable memory region of DRAM; and one or more small addressable memory regions, such that the sum of all addressable memory regions is significantly less than $2^{40}$ bytes (1 TB). To access a particular data value, a processing unit implements a request address bus that designates the memory location to be accessed.

Processing units may communicate with other processing units and memory through a transport mechanism. In such a system, addresses may be transmitted between units via buses in the transport mechanism and maybe stored in transaction tables. If the system contains cache coherent processing units, addresses may also be stored in cache tags. Many processing units and other interconnect agents implement directories. A directory is used to track which agents or processors in the system share data. For every agent that is tracked, there is a tracking bit needed in the tag line of the directory. Thus, as the number of agents grows, the directory size for tracking the information grows exponentially.

Storing full addresses, especially in structures such as cache tags, uses a significant amount of silicon area, which drives manufacturing cost, and transmitting full addresses requires additional wires that further increases silicon area. In addition, operating on full addresses requires significant logic gate delay that limits clock speed and system performance, and all of these artifacts increase the power consumption of the system. Therefore, what is needed is a system and method to track the patterns that represent how data is shared throughout the system and, thereby allow a reduction in the number of patterns that are tracked to help reduce the information stored in a directory.

SUMMARY OF THE INVENTION

In accordance with various aspects of the invention, a system and method are provided with the ability to track information in the form of patterns and determine the most frequently used patterns, thereby reducing the size of the information stored in a directory. Thus, the system's directory operates on fewer bits because fewer patterns are being tracked in the directory. By doing so, a system can use less silicon area, less power, operate at a higher clock speed, and do so at lower cost.

In accordance with various aspects of the invention, a method of performing . . . .

In accordance with various aspects of the invention, one embodiment includes a method of . . . area.

In accordance with various aspects, the invention is also embodied in a . . . that performs the above method.

BRIEF DESCRIPTION OF THE DRAWINGS

FIG. 5 illustrates a table maintained by the system based on an embodiment in of the invention.

DETAILED DESCRIPTION

Figure 1:
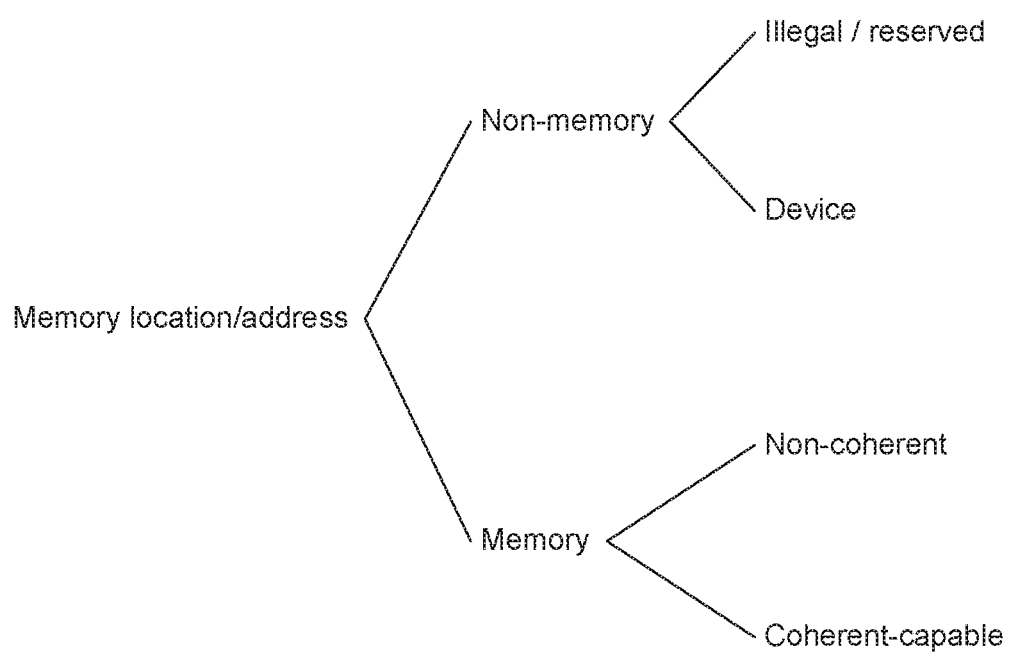
FIG. 1 illustrates a taxonomy of memory locations with various types of addressable elements according to aspects of the invention.

To the extent that the terms "including", "includes", "having", "has", "with", or variants thereof are used in either the detailed description and the claims, such terms are intended to be inclusive in a similar manner to the term "comprising". The invention is described in accordance with the aspects and embodiments in the following description with reference to the figures, in which like numbers represent the same or similar elements. Reference throughout this specification to "one embodiment," "an embodiment," or similar language means that a particular feature, structure, or characteristic described in connection with the various aspects and embodiments are included in at least one embodiment of the invention. Thus, appearances of the phrases "in one embodiment," "in an embodiment," "in certain embodiments," and similar language throughout this specification refer to the various aspects and embodiments of the invention. It is noted that, as used in this description, the singular forms "a," "an" and "the" include plural references, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates, which may need to be independently confirmed.

The invention can be embodied in, though not exclusively, a system-on-chip (SoC) that instantiates a cache coherent subsystem. The coherent subsystem has structures for one or more of storing addresses in transaction tables, storing information in FIFOs, storing cache tags, transporting addresses to or from interfaces, and operating on addresses. Some examples of operations are comparing, decoding, and adding.

According to some aspects of the invention, the method of compression of address bits is chosen based on the address map. This is practical only in systems that are configured with foreknowledge of the address map. Network-on-Chip (NoC) IPs that are generalized for the address map of any chip, or chips that are generalized for any programmable remapping of memory regions are able to take advantage of the disclosed compression to the extent that the address map is constrained in a known way. The aspects and embodiments of the invention are useful in physically addressed (i.e. post-MMU) caches within fully coherent agents. Furthermore, the scope of the invention is not limited to a specific type of memory; all forms of persistent and non-persistent word-addressable memory technologies, including register arrays, flash, etc.

For systems of configurable IP, a designer specifies addressable memory regions, and whether each is coherent. A software configuration tool then uses the specification to generate a hardware description of structures that implement compression according to the various aspects and embodiments of the invention.

Processing units, and other agents, assert addresses as part of performing memory transactions. As shown in FIG. 1, each memory location and its corresponding address represents a certain type of memory. In accordance with the various aspects of the invention, each address is first classified as a non-memory address or as a memory address. Non-memory addresses represent either illegal (reserved) locations or non-memory locations. Memory addresses represent either coherent-capable memory locations, i.e. those that are capable of coherency, or memory locations that are not capable of being coherent due to strict specification or design constraints. All cacheable memory is also coherent-capable memory. Memory locations that are not capable of being coherent are called non-coherent memory locations. Memory locations are grouped into memory regions such that each memory region corresponds to a particular addressable slave.

The scope of the invention is applicable to any type of addressable slaves in subsystems that use less than the full address space. According to some embodiments of the invention some such slaves are DRAMs and others are SRAMs. Embodiments disclosed herein are directed to use in coherent subsystems and refer to DRAM and SRAM slaves as examples. The invention is not limited to any particular type of coherent subsystem or any particular types of slaves or any specific type of memory.

In accordance with the aspects and embodiment of the invention a transport interconnect is utilized. As disclosed herein, a transport interconnect is a component of a system that implements functions and interfaces to allow other components to issue and receive transactions from each other. A transport interconnect is implemented by creating one or more of the following types of units:

(a). Ingress access units, which receive transactions from an external connected system component, and transmit them into the transport interconnect. Ingress units also perform access functions which may include, but are not limited to, protocol translation, transaction access semantics translation, transient transaction storage and re-ordering, splitting external access transactions into multiple internal transport interconnect transactions and merging multiple external access transactions into single internal transport interconnect transactions.

(b). Egress access units, which receive transactions from the transport interconnect, and transmit them to an external connected system component. Egress units also perform access functions which may include, but are not limited to, protocol translation, transaction access semantics translation, transient transaction storage and re-ordering, splitting internal transport transactions into multiple external access transactions and merging multiple internal transport transactions into single external access transactions.

(c). Link units, which have a single input connection and a single output connection. Link unit's primary function is to transport a transaction from the input connector to the output connector without reformatting or in any other way changing the transaction from its path from the input connector to the output connector. Typically, a link is simply a set of wires, but in some cases, it may be a pipelined datapath where transactions may take a number of clock cycles to travel from the input connect to the output connector.

(d). Switching units, which have one or more independent input connections and one or independent output connections. Each transaction that is received on an input connection is forwarded to an output connection. The specific output connection is selected by examining the incoming transaction. In some cases, the output port is explicitly named within the incoming transaction. In other cases, the output port is selected via algorithms implemented in the switch. Switching units may implement arbitration algorithms in order to ensure that transactions from input connections are forwarded output connections so as to satisfy the system requirements for transaction prioritization and starvation avoidance. Additionally, switch units may implement other functionality that may include, but is not limited to, security functions, logging transactions, tracing transactions, voltage domain management, clock domain management, bandwidth adaptation, traffic shaping, transient transaction storage, clock domain crossing and voltage domain crossing.

An interconnect transport is built by creating and connecting multiple units, of each type. Ingress units are connected to input connectors of link units or switch units. Egress units are connected to output connectors of link units or switch units. In addition, the input connection of a link unit connects to an output connection of a switch (or an Ingress unit), and the output connection of a link unit connects to an input connection of a switch (or an Egress unit).

A transport network, according to some embodiments of the invention, is packet-based. In some embodiments, it may support read requests, or write requests or both read and write requests, and issues a response to each request. In other embodiments, it may support read requests, or write requests or both read and write requests, and will not issue a response, or any other form of positive acknowledgment to every request. In other embodiments, the transport network is message-based. In some embodiments, multi-party transactions are used such that initiating agent requests go to a coherence controller, which in turn forwards requests to other caching agents, and in some cases a memory, and the agents or memory send responses directly to the initiating requestor.

In some embodiments, the transport network supports multicast requests such that a coherence controller can, as a single request, address some or all of the agents and memory. According to some embodiments the transport network is dedicated to coherence-related communication and in other embodiments at least some parts of the transport network are used to communicate non-coherent traffic. In some embodiments, the transport interconnect is a network-on-chip (NoC). In other embodiments, the transport interconnect has a switch topology of a grid-based mesh or depleted-mesh. In other embodiments, a network interconnect has a topology of switches of varied sizes. In some embodiments, the transport interconnect implements a switch topology of a crossbar. In some embodiments, a network-on-chip uses virtual channels.

Figure 2:
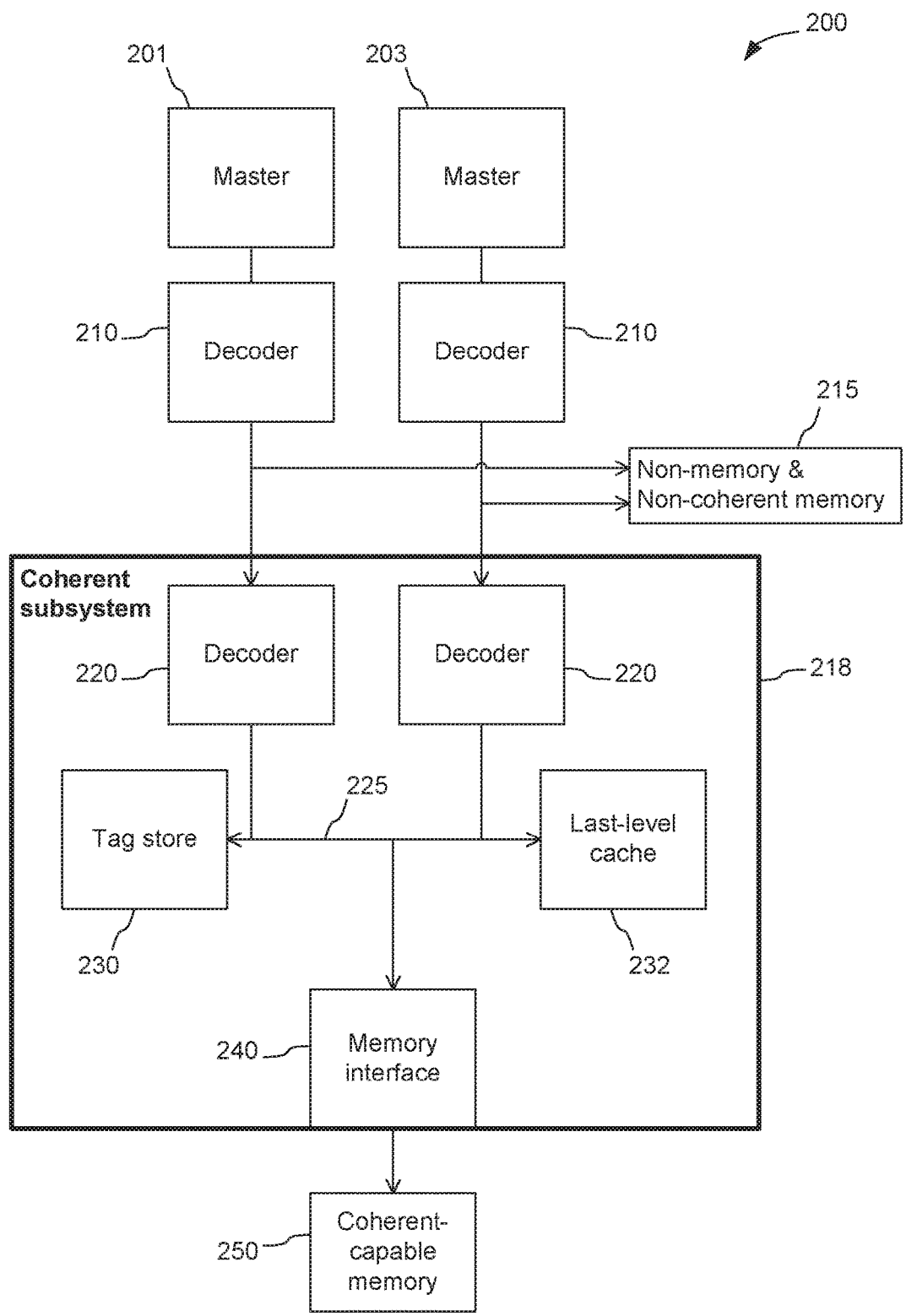
FIG. 2 illustrates a system including agents and memory regions including a coherent subsystem according to an embodiment of the invention.

Referring now to FIG. 2, in accordance with the various aspects of the invention, a system 200 with a representative memory that includes a cache coherent subsystem is shown. The system 200 includes requestor or agent 201 and agent 203. Agent 201 and agent 203 assert addresses that are equivalently decoded in decoders 210. In accordance with the various aspects of the invention and some embodiments, some agents need not access non-memory or non-coherent memory addresses. In such embodiments, decoders 210 are not present. In the embodiment of FIG. 2, transactions to non-memory locations and non-coherent memory locations are sent to units or slaves 215. A transaction, as used herein, includes a request and a response as well as an address. Transactions to coherent memory locations are sent to coherent subsystem 218 that includes a directory. Decoders 220 perform a further decoding operation on the addresses of the transaction and direct the transactions over transport network 225 to, as appropriate for the transaction, a tag store 230, a last-level cache 232, or a memory interface 240. The memory interface 240 sends transaction requests to coherent-capable memory slave 250.

Addresses asserted by agents that perform cache coherent transactions can be any number of bits, but in current systems addresses are typically from 32 to 64 bits. In one embodiment, a system has agents that assert 40 bit addresses. A 40 bit address is capable of addressing $2^{40}$ bytes, or 1 terabyte (TB), of data. Few current systems implement a single memory region with more than 4 gigabytes (GB) of data, and often the total legally addressable memory does not exceed 8 GB. That means that, theoretically, only log 2(8 GB)=33 address bits are needed to encode and access the slaves, and 7 of the 40 address bits are unnecessary. However, for various reasons generally relating to ease of computer programming, the ranges of the address space at which slaves are mapped are sparsely noncontiguous.

Figure 3:
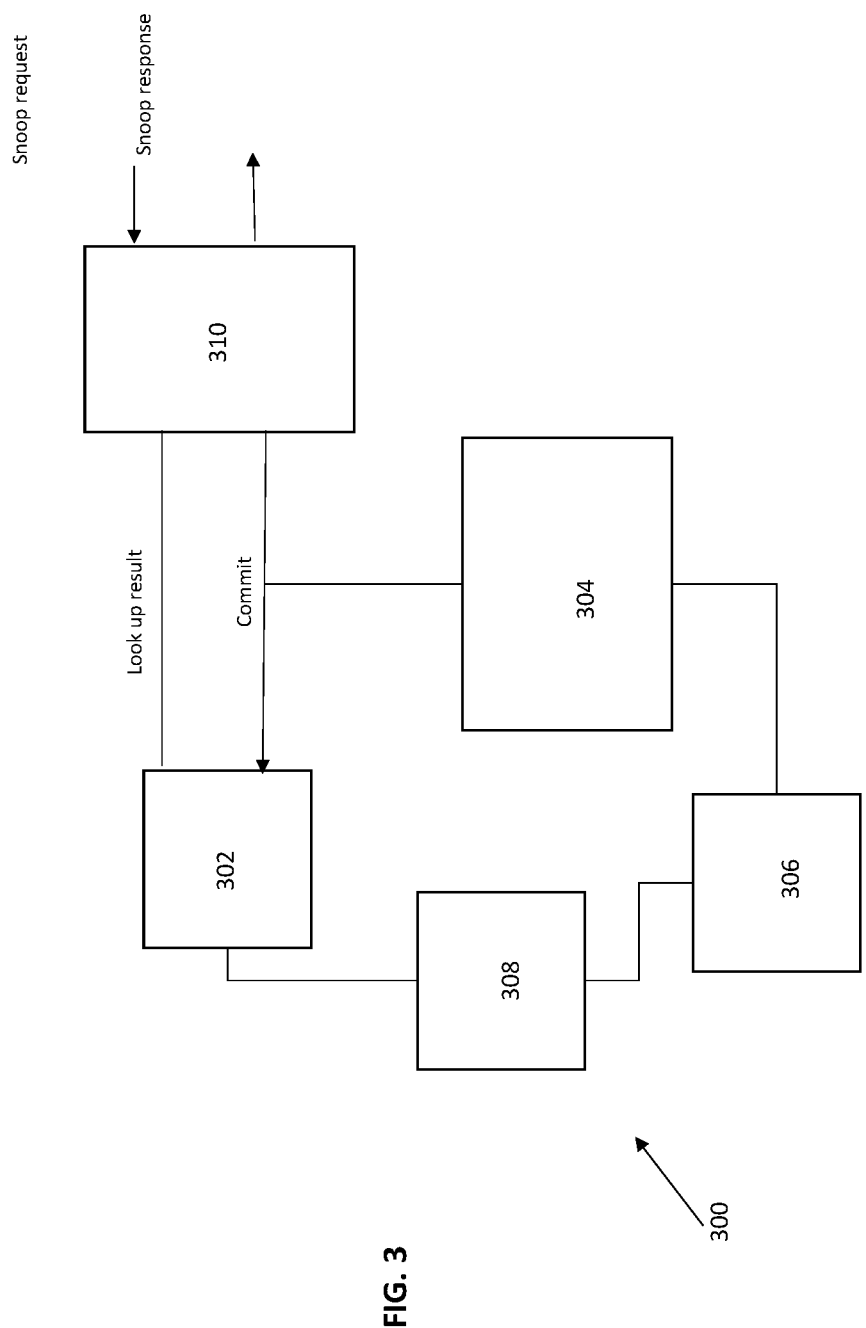
FIG. 3 illustrates a system that uses a directory based on an embodiment of the invention.
Figure 4:
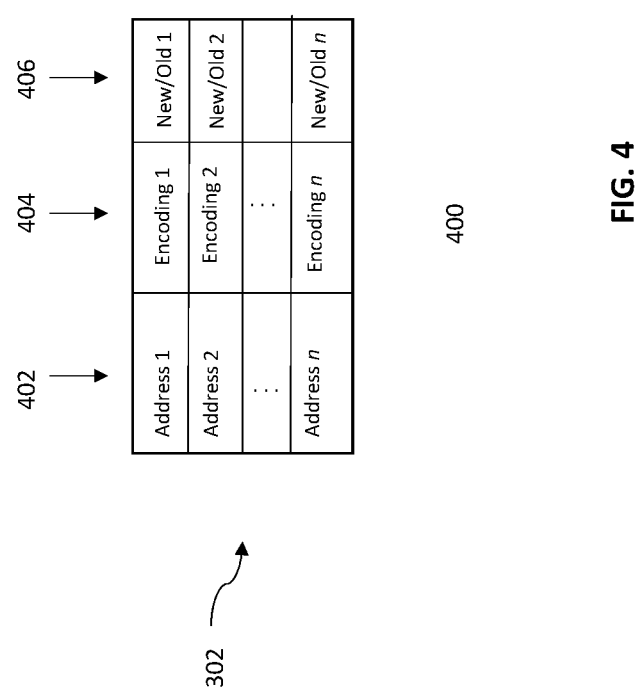
FIG. 4 illustrates a table for the system of FIG. 3 based on an embodiment of the invention.

Referring now to FIG. 3, shows a system 300 that includes a directory 302, a statistical logic unit 304, a decision logic unit 306, a defragment control logic unit 308, and a transport and coherency control unit 310. FIG. 4 shows the directory 302 that includes address information 402, encoding information 404 for each address line. The directory 302 includes a control bit 406. The control bit 406 tracks the status of the encoding for each address line (and the encoding information) and allows tracking the status of the encoding line, as discussed below, if an old encoding pattern is being used or if a new encoding pattern is being used. As used herein, a pattern of information that is stored in the directory is information about which agents, located in the system, have the information and are sharing the information. For example, if agent 2 and agent 5 are sharing the information or data, then that is stored in the directory and represents a specific pattern. Thus, each time agent 2 and agent 5 share have the same information or share the data, then the count for that pattern (agent 2 and agent 5) is incremented. In this way, the statistical logic unit 304 can track the patterns that are most often occurring and encode the most common patterns in the directory 302. This results in using fewer bits for tracking in formation in the directory because a limited number of patterns (the most common or the most frequently occurring) are tracked and committed to the directory 302. Thus, this allows the defragment control logic unit 308 that is in communication with the directory 302, at the time of updating the encoding, to know which encoding pattern needs to be updated as outline below.

In accordance with the aspects of the invention and various embodiments, there is a selected number of patterns that are tracked, which is a number of patterns selected from the entire group of possible patterns that can possibly be tracked. For example, if there are $2^{10}$ number of patterns that can possibly be tracked in a system (based on how the data is shared in the system), in one embodiment, the top $2^n$ patterns are tracked, as shown in FIG. 4, wherein "n" is less than 10 in this embodiment.

Referring now to FIG. 5 with FIG. 3, in accordance with some embodiments, the directory 302 is initially loaded with a default set of encoding information. The default set of encoding information is defined by the user in the hardware of the system upon initialization of the system. As the control unit 310 commits information (or data) and addresses to the directory 302, the statistical logic unit 304 increments a counter for that specific encoding pattern, as shown in FIG. 5 where "M" represents the maximum number of possible encoding. In accordance with some aspect of the invention and embodiments, the statistical logic unit 304 could also decrease the counter when an encoding is removed from the directory 302.

Figure 6:
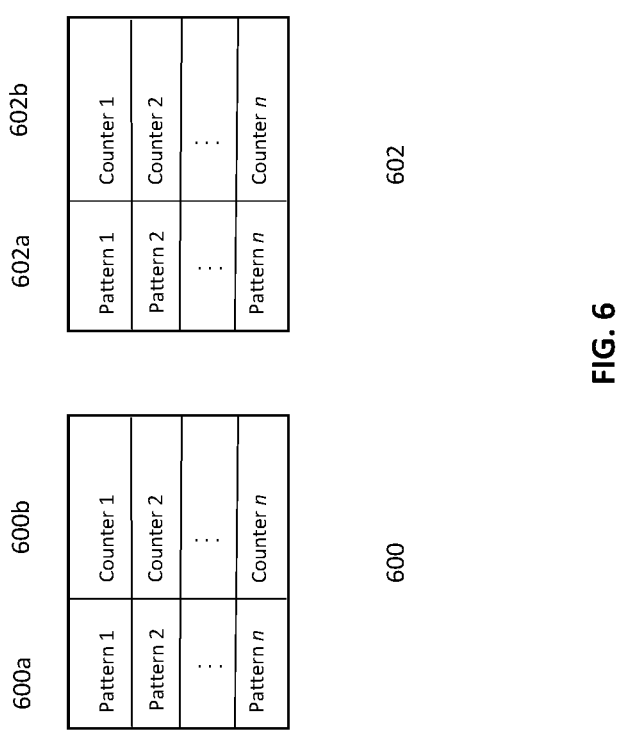
FIG. 6 illustrates new and old tables maintained by the system based on an embodiment of the invention.

Referring now to FIG. 6 in addition to FIG. 3 and FIG. 4, in accordance with various embodiments and aspects of the invention, the statistical logic unit 304 sends a signal to the digital logic unit 306 to update the encoding in the directory 302. The timing of the signal can be defined to be based on any parameter and the scope of the present invention is not limited thereby. For example, the signal from the statistical logic unit 304 to the digital logic unit 306 can be sent based on a duration of time, based on a specific event, or any other parameter. The digital logic unit 306 communicates with the defragment control logic unit 308 to update the encoding information stored in the directory.

In accordance with the various aspects and embodiments of the invention, there are two instances of the encoding information that are maintained by the statistical logic unit 304. One encoding information is table 600 and the other is encoding information is table 602. In accordance with one embodiment of the invention, table 600 is defined as the old encoding and identified by a "0" bit as the control bit 406 in FIG. 4. Table 602 is defined as the new encoding an identified by a "1" bit as the control bit 406 in FIG. 4. In accordance with one embodiment of the invention, table 600 is defined as the new encoding and identified by a "0" bit as the control bit 406 in FIG. 4. Table 602 is defined as the old encoding an identified by a "1" bit as the control bit 406 in FIG. 4. The scope of the invention is not limited by the label associated with the encoding or the control bits. The control bit 406 indicates if a table is used when updating the directory 302. As the directory 302 is updated, the statistical logic unit 304 updates the table 600 and the table 602.

In order to determine how to update the encoding in the directory 302, to the most frequently used patterns and determine the patterns that are maintained in directory 302, the statistical logic unit 304 maintain a counter 600b and 602b for each of the possible patterns 600a and 602a, respectively.

Figure 7:
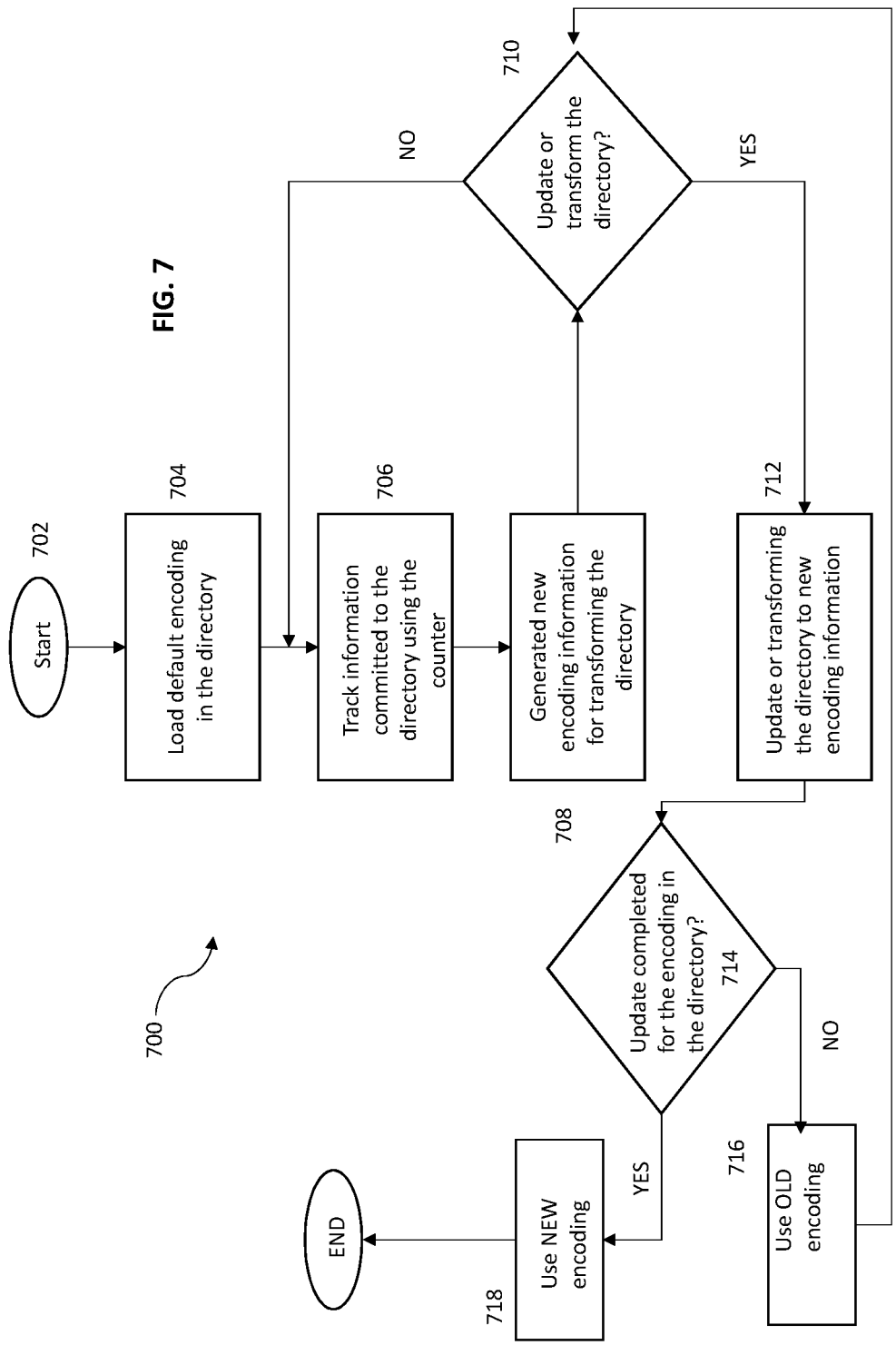
FIG. 7 illustrates a process for updating a directory of the system based on an embodiment of the invention.

Referring now to FIG. 7 along with FIG. 3, a process 700 in accordance with the invention begins at step 702. At step 704, a default encoding is loaded into the directory. As step 706, as information is committed to the directory, the statistical logic unit 304 increments the counter for that pattern or information. At step 708, the statistical logic unit 304 maintains and updates the encoding information as shown in FIG. 5. At step 710, the system, either based on hardware requirements or software requirements, determines if a signal has been sent (in accordance with one aspect of the invention the signal comes from the digital logic unit 306) to indicate that the defragment control logic unit 308 need to update or transform the encoding in the directory 302. If so, then the process proceeds to step 712, where the encoding information in the directory 302 is updated and the table 600 and table 602 are updated accordingly. At step 714, the system determines if the update is completed for the address and information or encoding in the directory 302. If not, then at step 716, the information stored in the table labeled as OLD, such as table 600 in FIG. 6, is used. If the update is complete, then the process at step 718 uses the information stored in the table labeled NEW, such as table 602 in FIG. 6.

In accordance with the various aspects of the invention, disclosed is a compressor for compressing addresses of coherent-capable slaves. In some embodiments, the compressor includes an interface for receiving an original address including a number of bits, logic to convert the original address to a compressed address including a smaller number of bits, and an interface for sending a compressed addressing including the smaller number of bits. In accordance with some aspects and embodiments the compressor's compression logic performs truncation. Additionally, according to some aspects, the compression logic encodes a selection pattern in at least one bit that is used to address data within the slave including the largest mapping but not used for at least one other slave. In accordance with aspects and embodiments, the selection pattern is one-hot.

In accordance with some aspects, one embodiment of the invention is a physically addressed cache within a fully coherent agent and the physically addressed cache includes a compressor for compressing addresses of coherent-capable slaves. The compressor includes an interface for receiving an original address including a number of bits, logic to convert the original address to a compressed address including a smaller number of bits, and an interface for sending a compressed addressing including the smaller number of bits.

As will be apparent to those of skill in the art upon reading this disclosure, each of the aspects described and illustrated herein has discrete components and features, which may be readily separated from or combined with the features and aspects to form embodiments, without departing from the scope or spirit of the invention. Any recited method can be carried out in the order of events recited or in any other order which is logically possible.

Unless defined otherwise, all technical and scientific terms used herein have the same meaning as commonly understood by one of ordinary skill in the art to which this invention belongs. Any methods and materials similar or equivalent to those described herein can also be used in the practice of the invention. Representative illustrative methods and materials are also described.

In accordance with the teaching of the invention a computer and a computing device are articles of manufacture. Other examples of an article of manufacture include: an electronic component residing on a mother board, a server, a mainframe computer, or other special purpose computer each including one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Where a range of values is provided, it is understood that each intervening value, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Therefore, the scope of the invention, therefore, is not intended to be limited to the various aspects and embodiments discussed and described herein. Rather, the scope and spirit of invention is embodied by the appended claims.

What is claimed is:

1. A method for reducing directory size within a system, the method comprising:

setting, by a defragment control logic unit, a default encoding for a directory having a plurality of patterns, wherein each pattern represents sharing of information among agents in the system and each pattern has a counter value;

tracking, by a statistical logic unit, through updating the counter value for each pattern as each pattern is committed to the directory;

generating an update encoding for the directory that includes a group of patterns that have a highest counter value;

updating the directory from the default encoding to the updated encoding; and determining, using a control bit, if the updated encoding is a new encoding or an old encoding.

2. The method of claim 1, wherein the step of tracking includes the step of incrementing the counter for each pattern.

3. The method of claim 2, wherein the step of generating includes selecting the group of patterns.

4. The method of claim 1, further including the steps of:

using a control bit entry for each address line encoded in the directory, the control bit entry indicating if the pattern is at least one of old encoding or new encoding; and maintain a first table and a second table, the first table is an old encoding and the second table is a new encoding, wherein the control bit entry determines if encoding from the first table or the second table is used by the system.

5. The method of claim 1, wherein the step of updating includes defragmenting, by the defragment control logic unit, the directory based on the updated encoding.

* * * * *